United States Patent
Gottlieb

(10) Patent No.: US 6,258,313 B1
(45) Date of Patent: Jul. 10, 2001

(54) STRETCH BLOW MOLDING PROCESS AND APPARATUS FOR THE MANUFACTURING OF PLASTIC CONTAINERS

(75) Inventor: Norman J. Gottlieb, Thornhill (CA)

(73) Assignee: Container Corporation International Inc., Bridgetown (BB)

( * ) Notice: Subject to any disclaimer, the term of this patent is extended or adjusted under 35 U.S.C. 154(b) by 0 days.

(21) Appl. No.: 09/304,050

(22) Filed: May 4, 1999

(51) Int. Cl.[7] .................................................. B29C 49/64
(52) U.S. Cl. .......................... 264/458; 264/521; 264/532; 264/535; 425/174.4; 425/526; 425/529; 425/534
(58) Field of Search .................................. 264/454, 458, 264/521, 532, 535; 425/526, 529, 534, 174.4

(56) References Cited

U.S. PATENT DOCUMENTS

| | | | |
|---|---|---|---|
| 3,761,550 | * 9/1973 | Seefluth | 264/535 |
| 3,787,170 | * 1/1974 | Gilbert | 264/535 |
| 4,357,288 | * 11/1982 | Oas et al. | 264/535 |
| 4,690,633 | * 9/1987 | Schad et al. | 425/534 |
| 5,032,700 | * 7/1991 | Sugiyama et al. | 425/174.8 R |
| 5,066,222 | 11/1991 | Roos et al. | 425/526 |
| 5,145,632 | 9/1992 | Denis et al. | 425/526 |
| 5,229,042 | 7/1993 | Denis et al. | 425/526 |
| 5,256,341 | 10/1993 | Denis et al. | 425/526 |
| 5,277,574 | 1/1994 | Denis et al. | 425/526 |
| 5,326,258 | 7/1994 | Gittner et al. | 425/526 |
| 5,334,007 | 8/1994 | Denis et al. | 425/526 |
| 5,338,181 | 8/1994 | Denis et al. | 425/526 |
| 5,342,558 | 8/1994 | Denis et al. | 425/526 |

FOREIGN PATENT DOCUMENTS

| | | | |
|---|---|---|---|
| 40 33 531 A1 | * 5/1992 | (DE) | 264/535 |
| 61-261024 | * 11/1986 | (JP) | 264/535 |
| 62-77919 | * 4/1987 | (JP) | 264/535 |
| 5-269828 | * 10/1993 | (JP) | 264/521 |

* cited by examiner

Primary Examiner—Robert Davis
(74) Attorney, Agent, or Firm—Nancy E. Hill; Hill & Schumacher

(57) ABSTRACT

A stretch blow molding process and apparatus for the manufacturing of plastic containers includes the step of preheating the preform. In particular the preheating step includes directly heating the inside of the preform. This is particularly important during the processing of polypropylene. The method for heating plastic preforms for the stretch blow molding thereof comprises the steps of heating the outside of the preforms with at least one infrared radiation lamp and directly heating the inside of the preforms. Preferably the heating of the outside and the heating of the inside is performed concurrently. The apparatus for use in the preheat step of a preform during a stretch blow molding process includes a channel; a plurality of chucks and a method of directly heating the inside of the preforms. The plurality of chucks are movably connected to the channel and each chuck is adapted to receive a preform. The inside of the preform is heated as the chuck moves along the channel. The inside of the preform may be directly heated by blowing hot air into the preform, inserting a calory or infrared rod inside the preform or a combination of both.

9 Claims, 3 Drawing Sheets

STRETCH BLOW MOLDING PROCESS AND APPARATUS FOR THE MANUFACTURING OF PLASTIC CONTAINERS

FIELD OF THE INVENTION

This invention relates to the equipment and a process for the manufacture of plastic containers and in particular a process for the manufacture of polypropylene containers which includes the direct heating of the inside of a preform during the preheat step in a stretch blow molding process.

BACKGROUND OF THE INVENTION

Injection molding and injection stretch molding is well known particularly in relationship to polyethylene terephthalate (PET). However, there are limitations to the use of PET products. In particular PET molded containers used in a hot fill process generally undergo undue deformation and therefore generally PET molded containers are not generally used with materials that require hot fill.

The process of stretch blow molding PET bottles is well known and involves the steps of manufacturing the preform generally by way of injection molding; heating the preform; and then stretch blow molding the heated preform. The manufacture of the preform is generally done remote from the blow molding of the bottles since the preforms are considerably smaller than the bottles and thus cheaper to transport. Accordingly, the manufacture of the bottles is often performed at the bottling site.

Polypropylene is a material that is currently only being used in a limited range of products. In particular the current polypropylene containers are generally opaque and thus not suitable for a wide variety of products. In particular in the food industry the consumer wants to be able to see the product being sold and thus products that are sold in opaque containers are not desirable.

Since the current methods of injection stretch blow molding PET preforms are very focussed on the processing characteristics of the polyester substrate these methods cannot be used for polypropylene. Specifically the machines used in these prior art methods cannot process polypropylene for the following reasons:
(a) the rate of heating of polypropylene is significantly slower than PET;
(b) the processing window for polypropylene is much shorter than PET;
(c) the technology to engineer preforms is significantly different than PET because of the stretch ratio differentials as well as the properties of the material itself;
(d) heating patterns and thermal conductivity of polypropylene are very different from those of PET; and
(e) the polypropylene preforms are thicker and bulkier than PET preforms.

Accordingly, if current rotary wheel PET processing equipment is used to process polypropylene generally there are the following problems:
(a) slugging of material in the base or neck;
(b) blowouts;
(c) off center gates; and
(d) bands of material in the neck or panel areas.
Many of these problems are related to the high degree of sensitivity to temperature variations of polypropylene.

Until now most attempts at injection stretch blowing polypropylene have been unsuccessful because of the lack of the precision in coordinating the appropriate heating of the external and internal walls of the preforms. Current heating devices, typically lamps, have been developed for heating PET and are positioned on the outside of the preforms to heat the outside thereof. In addition, the attempts have been unsuccessful because the machines developed for PET cannot accommodate the short processing window and the conditions for inflation which must be within very strict tolerances, much stricter than those required for PET.

Therefore with the development of new polypropylene including clarified polymer resins, co-polymer resins and random co-polymer resins it is now possible to produce, given the right processing conditions, a high clarity container made from polypropylene. Further, this container could be further enhanced with oxygen barrier chemistry technology.

Accordingly, it would be advantageous to provide a stretch blow molding apparatus and process for the manufacturing of polypropylene containers.

SUMMARY OF THE INVENTION

The present invention is directed to a stretch blow molding process and apparatus for the manufacturing of plastic containers including the step of preheating the preform. In particular the preheating step includes directly heating the inside of the preform. This is particularly important during the processing of polypropylene. The method for heating plastic preforms for the stretch blow molding thereof comprises the steps of heating the outside of the preforms with at least one infrared radiation lamp and directly heating the inside of the preforms. Preferably the heating of the outside and the heating of the inside is performed concurrently.

In another aspect of the invention an apparatus for use in the preheat step of a preform during a stretch blow molding process includes a channel; a plurality of chucks and a method of directly heating the inside of the preforms. The plurality of chucks are movably connected to the channel and each chuck is adapted to receive a preform. The inside of the preform is heated as the chuck moves along the channel. The inside of the preform may be directly heated by blowing hot air into the preform, inserting a calory or infrared rod inside the preform or a combination of both.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

The process of stretch blow molding PET bottles is well known and involves the steps of manufacturing the preform generally by way of injection molding: heating the preform; and then stretch blow molding the heated preform. Both linear and rotary systems have been developed for the manufacture of PET bottles. The process for PET bottles cannot be reliably used for polypropylene bottles. Specifically a new preheat step is required to reliably manufacture polypropylene bottles. There are a number of differences between PET and polypropylene that need to be considered when designing a preheat process and stretch blow molding process for polypropylene. For example once PET is blow molded it is a self limiting material as compared to polypropylene which is not self limiting. Further in the blow molding process polypropylene is typically stretched in a ratio of 1 to 3. As well the infrared absorption spectrum of PET is different from polypropylene. Thus the preforms for polypropylene are shorter and thicker than for PET. The method of the present invention is a method of heating the preforms that directly heats the inside of the preform.

Figure 1:
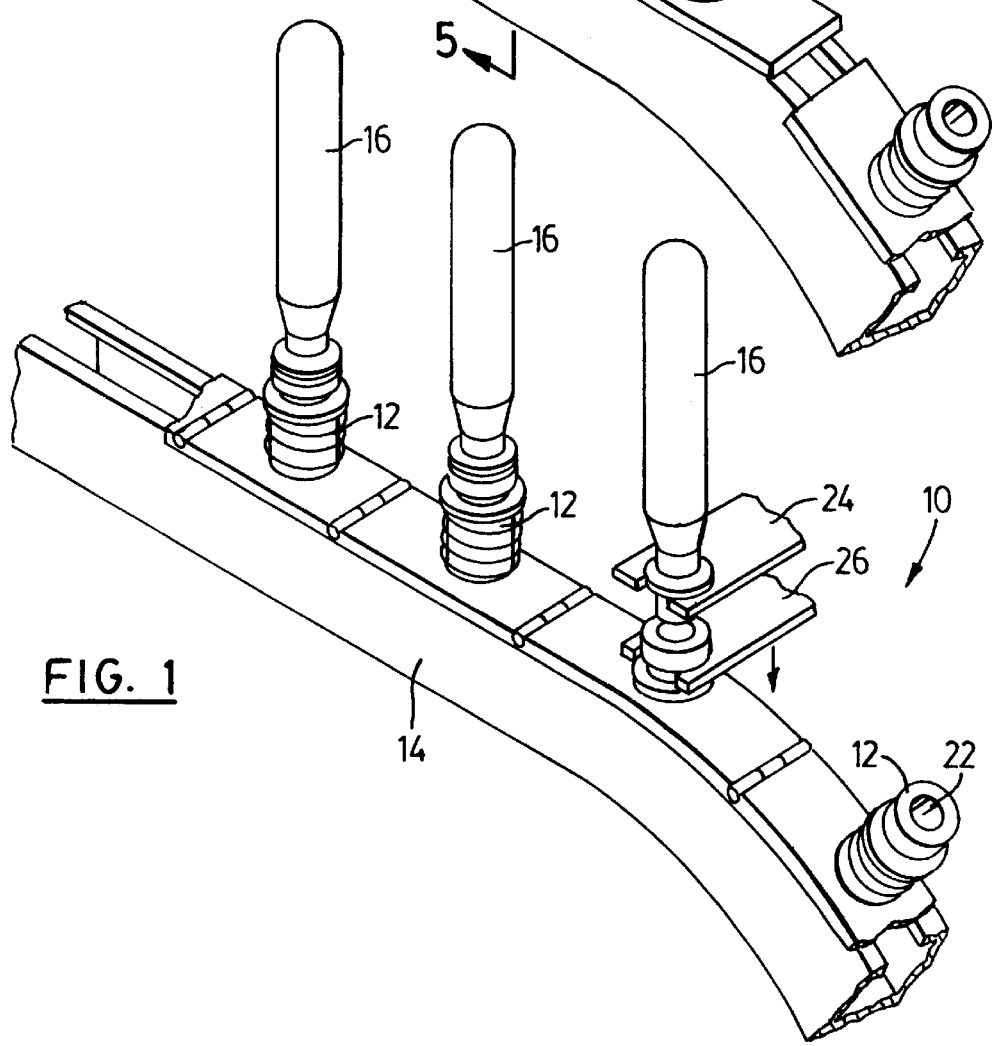
FIG. 1 is a perspective view of the preheat apparatus of the present invention.
Figure 3:
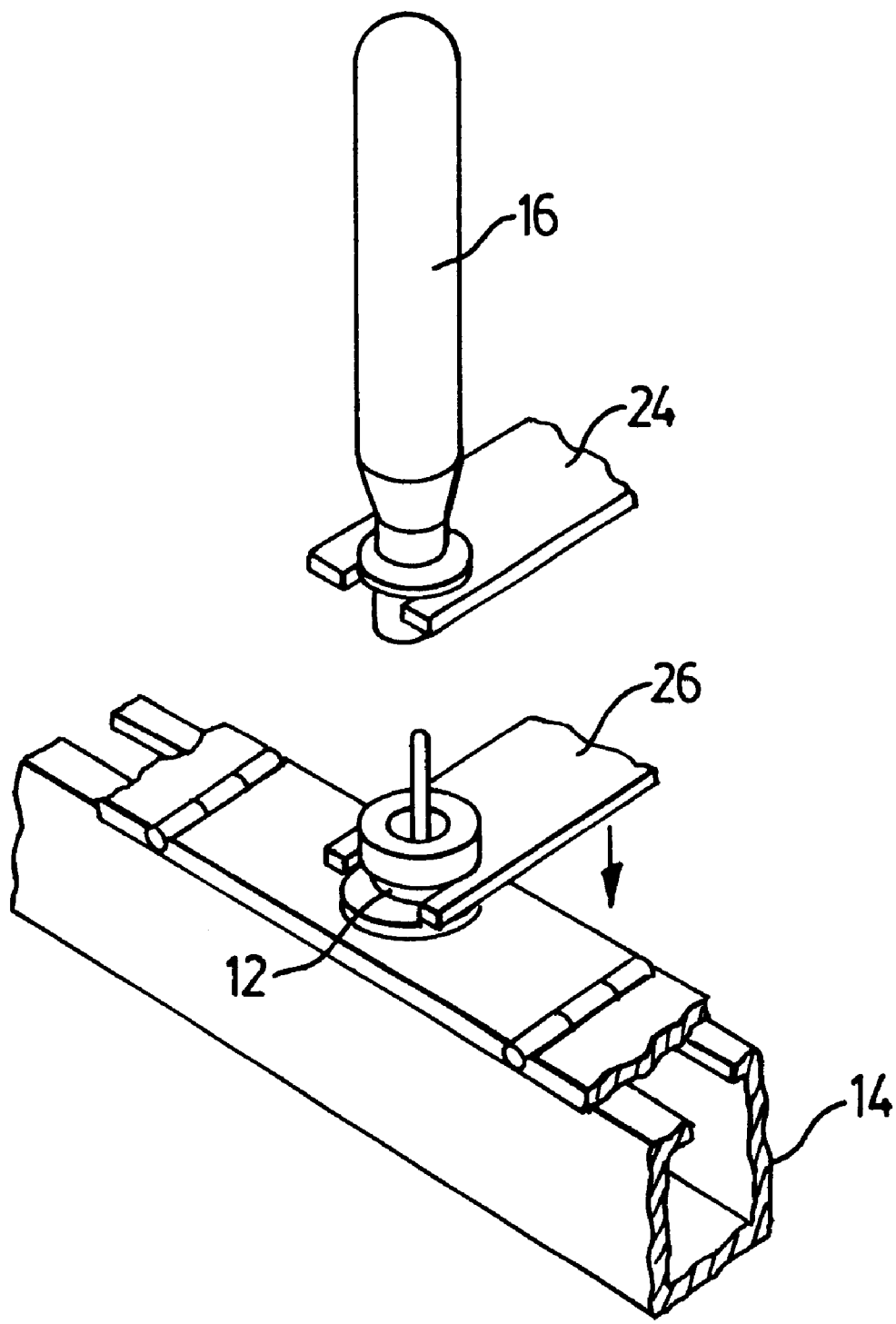
FIG. 3 is a perspective view the heated preform being removed from the chuck of the preheat apparatus of the present invention.

Referring to FIG. 1, the apparatus for the preheat step of the present invention is shown generally at 10. The preheat step of the present invention is adapted to be included in a high speed manufacturing process for stretch blow molding plastic bottles and in particular for stretch blow molding polypropylene bottles. The apparatus is adapted for preheating plastic preforms and in particular for heating polypropylene preforms. Preheat apparatus 10 includes a plurality of chucks 12 which move along channel 14. A preform 16 is secured to a chuck 12 at the beginning of the preheat step and removed from the chuck at the end of the preheat step as shown in FIG. 3. Removal is performed with an upper and a lower removing forks 24 and 26 respectively. Lower removing fork 26 holds the chuck 12 and moves it downwardly into the channel 14 and upper removing fork 24 holds the heated preform 16 and carries it to the next processing station (not shown).

Figure 4:
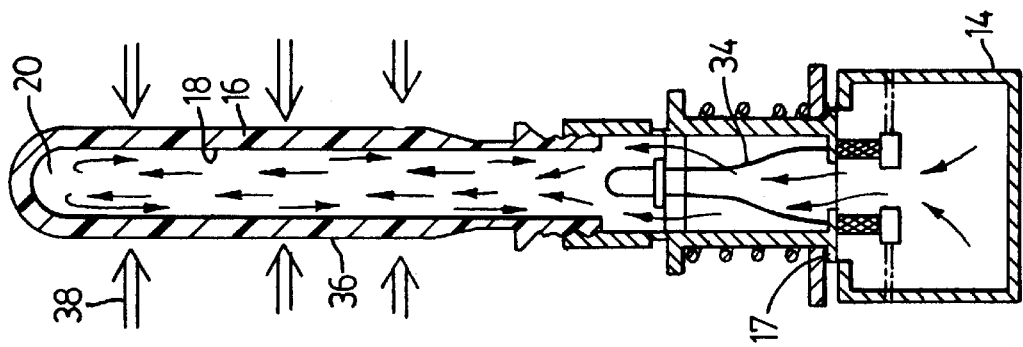
FIG. 4 is a sectional view of a preform and a chuck of the present invention having an aperture formed therein into which heated air may be circulated.

Referring to FIGS. 1 and 4, preheat step 10 provides a method of directly heating the inside 18 of the preform 16. In one embodiment the preheat step of the present invention directly heats the internal volume 20 of the preform by blowing controlled hot air as shown with arrows 15 through the chucks 12 which hold the preform in an upside down position. Adjacent chucks 12 are connected together as shown in FIG. 1 and channel 14 is sealed such that it forms a plenum into which hot air is blown. A gasket 17 is provided to seal the chuck 12 to the channel 14. Chucks 12 have a central aperture 22 so that the hot air will be blown into the internal volume 20 of the preforms 16. The time and length and heating of the interior is preformed and timed exactly so that the interior temperature of the preform 16 is equilibrated with the exterior. Thus internal preheat can take place during the high speed process.

Generally the preform is heated to a temperature of 130° C.±2° C. However, the temperature will vary depending on the initial shape of the preform and the desired end result.

Alternatively in certain circumstances it is desirable to differentially heat the inside of the preform 16 as compared to the outside of the preform 16 or a portion of the preform as compared to another portion of the preform. Once the preheat step 10 is completed the preform 16 is conditioned for inflating.

The neck area is insulated (not shown) during the preheat step so that the neck does not overheat and distort. Well known methods of insulating the neck can be used.

Figure 2:
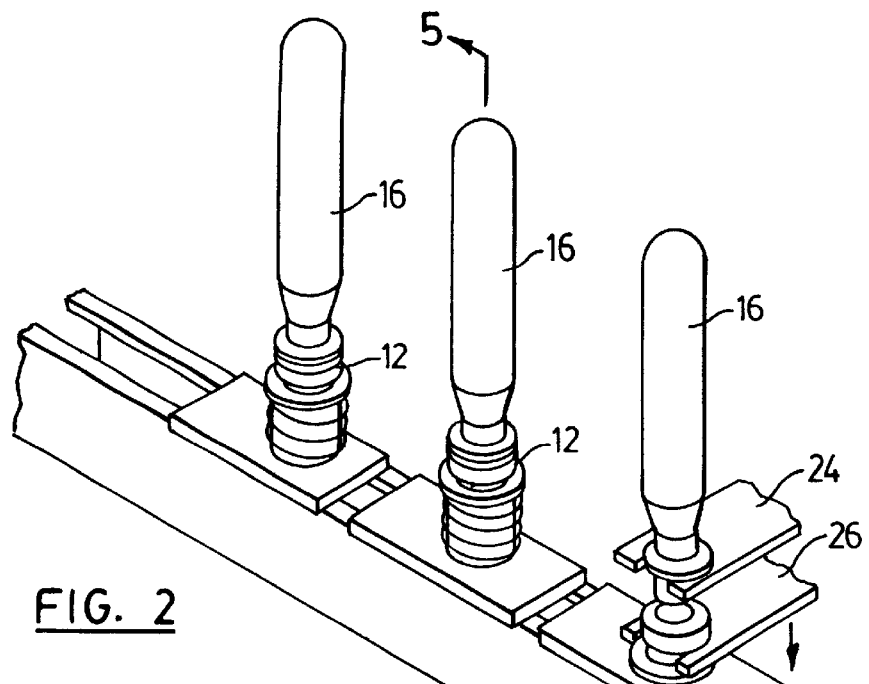
FIG. 2 is a perspective view of an alternate preheat apparatus of the present invention.
Figure 5:
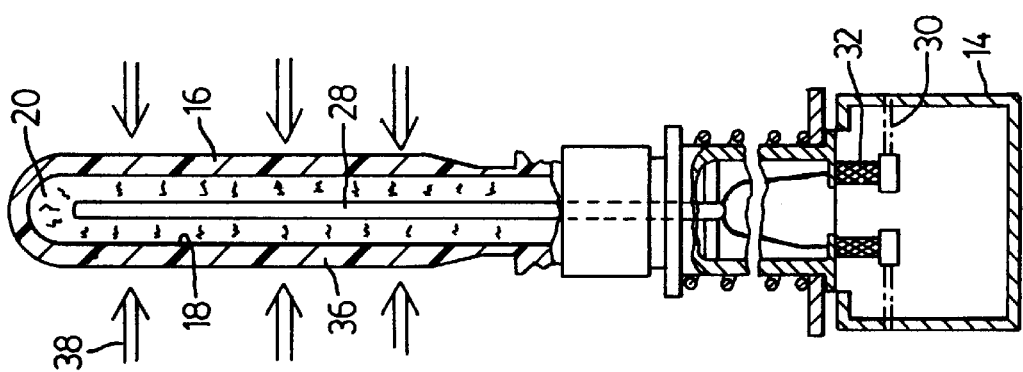
FIG. 5 is a sectional view of a preform and an alternate chuck of the present invention having an infra-red heating rod extending inside the preform.

Referring to FIGS. 2 and 5, an alternate method for directly heating the internal volume of the preform is with a calory rod or elongate infrared radiation rod 28 connected to the chuck 12 which extends upwardly into the internal volume 20 of the preform. A pair of electrical conductors 30 follows the path of the channel 14. The Calory rod 28 is electrically connected to the electrical conductors 30. Brush filaments 32 are connected to the chuck 12 and electrically connected to the calory rod 28. The brush filaments 32 run along the electrical conductors 30 so that the internal volume of the preform can be heated while the preform moves along the channels during the preheat step. Referring to FIG. 2 the channel need not be sealed since air is not blown into the channel and therefore the chucks 12 need not be attached together. Thus internal preheat can take place during the high speed process.

Figure 6:
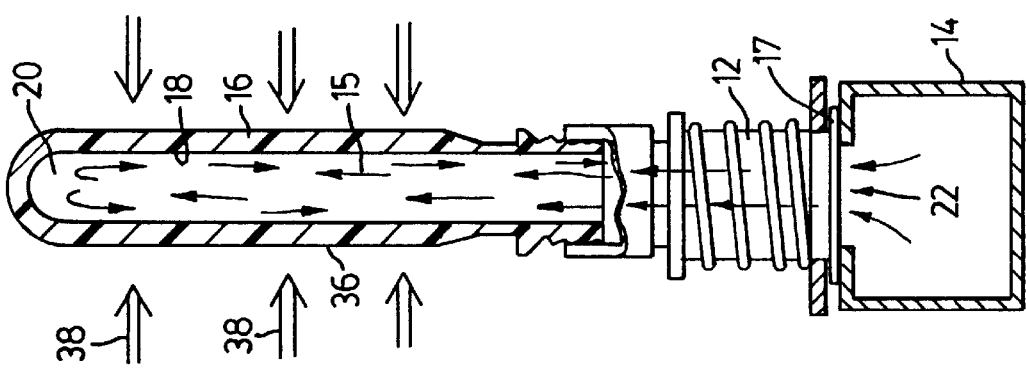
FIG. 6 is a sectional view of a preform and an alternate chuck of the present invention having an infra-red heating rod extending inside the preform and into which heated air may be circulated.

Referring to FIG. 6, a second alternate method for directly heating the internal volume of the preform combines the above two methods. A shorter infrared rod 34 is used in conjunction with blowing hot air.

Concurrently with heating in the inside of preform 16 the outside 36 is heated. Generally the outside is heated with a plurality of parallel horizontal infrared rods shown in FIGS. 4. 5 and 6 as arrows 38. Preferably the infrared rods 38 are separately controlled such that the outside of preform 16 can be longitudinally differentially heated. Thus the apparatus of the present invention can be preferentially controlled so that it can be adapted for use with plastics of varying infrared absorption spectrum and shapes of preforms. The apparatus is specifically adapted for the infrared absorption spectrum of polypropylene and preforms that are shorter and thicker than PET preforms.

The preheat step of the present invention is adapted to be included in the equipment for inflating a polypropylene preform. The equipment is capable of withstanding, without appreciable deformation, relatively severe thermal conditions encountered during processing of the preform. The equipment uses meshing rotary wheel assemblies which can process preforms at a very fast rate. Typically current linear or mold shuttle opening and closing machines are not able to achieve the same production rates as the rotary wheel assemblies. The preheat step of the present invention is adapted to be used in either method but preferably it will be used in the rotary wheel assemblies equipment because of the higher rates of production.

It will be appreciated that the above description relates to one embodiment by way of example only. Many variations on the invention will be obvious to those skilled in the art and such obvious variations are within the scope of the invention as described herein whether or not expressly described.

What is claimed as the invention is:

1. A method for heating plastic preforms for the stretch blow molding thereof comprising the steps of:
   placing the preforms on chucks that are sealed to a channel thereby forming a plenum:
   heating the outside of the preforms with at least one infrared radiation lamp; and
   directly heating the inside of the preforms by blowing hot air through the plenum and through central apertures in the chucks and into the preforms.

2. A method of heating plastic preforms as claimed in claim 1 wherein the plastic preform is a polypropylene preform.

3. A method of heating plastic preforms as claimed in claim 2 wherein the steps of heating the outside of the preforms and heating the inside of the preforms are performed concurrently.

4. A method of heating plastic preforms as claimed in claim 2 wherein the step of directly heating the inside of the preforms further comprises heating with an infrared radiation lamp extending upwardly inside the internal volume of the preforms.

5. A method of heating plastic preforms as claimed in claim 2 wherein the heating of the outside of the preforms is performed with a plurality of infrared radiation lamps arranged at different positions relative to the longitudinal axis of the preforms.

6. A method of heating plastic preforms as claimed in claim 5 wherein each of the plurality of radiation lamps has a separate temperature control such that different longitudinal positions along the preforms are heated differentially.

7. An apparatus for use in the step of preheating a preform in a stretch blow molding process comprising:

a channel;

a plurality of chucks each having a central aperture formed therein, the chucks being movably connected to the channel and adapted to move therealong, each chuck being adapted to receive a preform whereby the chucks are sealed to the channel thereby forming a plenum; and a means for directly heating the inside of the preform as the chucks move along the channel, by blowing hot air through the central apertures in the chucks into the preform.

8. An apparatus as claimed in claim 7 wherein the heating means further includes a calory rod attached to each chuck and extending into the internal volume of the preform.

9. An apparatus as claimed in claim 7 wherein the calory rod extends proximate to the top of the preform.

* * * * *